United States Patent
Hazama et al.

(10) Patent No.: US 6,539,399 B1
(45) Date of Patent: Mar. 25, 2003

(54) STAND ALONE DATA MANAGEMENT SYSTEM FOR FACILITATING SHEET METAL PART PRODUCTION

(75) Inventors: Kensuke Hazama, La Mirada, CA (US); Nishio Hisashi, La Mirada, CA (US); Li-Teh Chiu, La Mirada, CA (US); James Jin, La Mirada, CA (US); Marrisa Pang, La Mirada, CA (US)

(73) Assignee: Amada Company, Limited, Kanagawa Pref. (JP)

( * ) Notice: Subject to any disclaimer, the term of this patent is extended or adjusted under 35 U.S.C. 154(b) by 0 days.

(21) Appl. No.: 09/301,547

(22) Filed: Apr. 29, 1999

(51) Int. Cl.[7] ............................................... G06F 17/30
(52) U.S. Cl. ........................ 707/104.1; 707/3; 707/10; 707/203; 700/95
(58) Field of Search ................................. 707/1–4, 100, 707/102, 104, 10, 104.1, 201, 203; 705/28, 29; 700/95, 96, 112, 116, 165, 182

(56) References Cited

U.S. PATENT DOCUMENTS

| | | | |
|---|---|---|---|
| 4,998,206 A | * 3/1991 | Jones et al. | 700/145 |
| 5,307,282 A | * 4/1994 | Conradson et al. | 705/28 |
| 5,339,247 A | * 8/1994 | Kirihara et al. | 705/29 |
| 5,579,231 A | * 11/1996 | Sudou et al. | 700/95 |
| 5,771,172 A | * 6/1998 | Yamamoto et al. | 705/29 |
| 5,777,877 A | * 7/1998 | Beppu et al. | 707/29 |
| 5,884,315 A | * 3/1999 | Dunn | 707/102 |
| 6,119,102 A | * 9/2000 | Rush et al. | 705/29 |
| 6,199,059 B1 | * 3/2001 | Dahan et al. | 707/3 |

FOREIGN PATENT DOCUMENTS

| | | | |
|---|---|---|---|
| EP | 0355454 | 2/1990 | |
| EP | 0-419013 A2 | * 3/1991 | 17/30 |

OTHER PUBLICATIONS

"HILDA—Highly Logistics Database Application," Regina A. Wong. Pratt & Whitney, Proceedings of the 1997 Conference on Autotestcon, IEEE, pp. 601–604, Sep. 22–25, 1997.*

"The Numerical Control Information Utility: concepts and Considerations," Gastone Chingari, proceedings of the 22nd National Conference, pp. 541–551, see pages 548–551.*

* cited by examiner

Primary Examiner—Hosain T. Alam
(74) Attorney, Agent, or Firm—Greenblum & Bernstein, P.L.C.

(57) ABSTRACT

A method is provided for managing data files, which reside on a computer network, relating to sheet metal part production. The method includes the steps of creating an identifier for a sheet metal part, linking the identifier with all the data files relating to the production of the sheet metal part, and selecting multiple linked data files in accordance with predetermined criteria. Consequently, when the identifier is operated on, the selected linked data files are substantially simultaneously subject to the same operation. The creating may include obtaining a sheet metal part name, determining a virtual folder hierarchy, and concatenating the virtual folder hierarchy and the sheet metal part name. All identifiers are stored in a single directory. The method may also include storing an index that includes a virtual folder hierarchy, and updating the index after every successful operation. The method may also include connecting to a server that is storing the data files.

17 Claims, 10 Drawing Sheets

STAND ALONE DATA MANAGEMENT SYSTEM FOR FACILITATING SHEET METAL PART PRODUCTION

BACKGROUND OF THE INVENTION

1. Field of the Invention

The present invention relates to a data management system for use within a sheet metal part production environment. More particularly, the present invention relates to a distributed database system that enables easy manipulation of the multiple files required for automated sheet metal part production.

2. Background Information

A computerized sheet metal manufacturing process typically begins by generating a computer model of a sheet metal part that a manufacturer would like to produce. A computer-aided design (CAD) system may be employed to design the computer model of the sheet metal part to facilitate manufacturing of the part. After the model has been generated, it may be analyzed in order to ascertain appropriate tooling and procedures necessary to manufacture the part. A computer-aided manufacturing (CAM) system helps select appropriate tooling and also generates additional useful manufacturing information, such as a bending sequence. A post processing system may be used to convert the tooling and manufacturing data into data that is specific to a particular numerical control (NC) device.

Each of the CAD, CAM, and post processing systems generates data files corresponding to the sheet metal part that will be manufactured. Thus, multiple data files relating to the manufacturing are created. A user works with the multiple data files when designing or manufacturing the part, and thus the user requires access to the data within the various files. In order to access the data, the user must know the types of files available and the types of files needed. Typically the user consults a manual to determine the files associated with a particular sheet metal part to determine the necessary files. However, referring to a manual is time consuming. Furthermore, because multiple files exist, the user must perform an operation on each individual file. For example, if the user wants to delete a part, the user must delete each file individually. Thus, manipulating the various files related to the part is also time consuming.

To further complicate the situation, even more data files are generated. In order to manufacture a sheet metal part, the part is subjected to different manufacturing processes, for example, punching, laser cutting, and bending, before the part is finished. Each manufacturing process requires different data and thus different files. Moreover, when the manufacturer develops tooling and manufacturing data for a sheet metal part, the manufacturer needs data files associated with a particular NC machine that will physically operate on the sheet metal. Thus, when the manufacturer develops production plans for different NC machines, additional data is generated. Consequently, a system is needed for allowing the user to easily work with the various data files related to the manufacture and design of a specific sheet metal part.

Furthermore, because different data is generated for different NC machines, and because different data is generated for different manufacturing processes, any file relating to a sheet metal part cannot have a simple name, such as the sheet metal part name, e.g., "PART_232." Rather, filenames must be complicated, often incorporating the machine type or manufacturing process into the filename. Consequently, there is a need for a system that allows the user to generally identify data files with a simple filename.

Computer system for organizing and handling the various data files associated with a particular sheet metal part are known. However, the known systems involve complicated database programs, which a manufacturer usually does not want to take the time to learn. In addition, the dedicated database systems have heavy resource requirements. The database systems run continuously consuming central processing unit (CPU) resources and typically require dedicated servers, in addition to the knowledge necessary to run the program. Furthermore, such dedicated systems typically have specific operating system requirements and are expensive.

In addition to the disadvantages discussed above, the known systems lack important features that would benefit a sheet metal part production environment. For example, the systems typically do not allow a user to easily organize the files associated with the sheet metal parts. Furthermore, the systems do not associate a part with all of its related files, including the different files associated with various manufacturing processes. Consequently, the prior art systems require the user to perform any requested operations individually on each file associated with the sheet metal part. For example, if a sheet metal part has ten associated files, and the user wants to delete the part, the user must delete ten files. Consequently, a need exists for a distributed data management system that enables a user to operate on a part's associated files without having to repeat the operation for each individual file.

SUMMARY OF THE INVENTION

In view of the foregoing, the present invention is directed to providing a distributed database system that associates all related data files with a simple identifier of the part being manufactured.

A method is provided for managing data files relating to sheet metal part production. The data files reside on a computer network. The method includes the steps of creating an identifier for a sheet metal part, linking the identifier with all the data files relating to the production of the sheet metal part, and selecting multiple linked data files in accordance with predetermined criteria. Consequently, when the identifier is operated on, the selected linked data files are substantially simultaneously subject to the same operation. Preferably, the predetermined criteria is a manufacturing process.

The creating may include obtaining a sheet metal part name, determining a virtual folder hierarchy, and concatenating the virtual folder hierarchy and the sheet metal part name. All identifiers may be stored in a single directory. Preferably, the selecting includes retrieving an image file and displaying the image file.

The method may also include storing an index that includes a virtual folder hierarchy, and updating the index after every successful operation. The method may also include connecting to a server that is storing the data files.

A computer readable medium is provided for storing a database related to sheet metal part production. The medium includes multiple data files associated with sheet metal parts, and multiple identifiers representing the sheet metal parts, each identifier being linked to multiple data files associated with the represented sheet metal part. Consequently, when the identifier is operated on, selected linked data files are substantially simultaneously subject to the same operation.

According to a preferred embodiment, the identifiers include a virtual folder hierarchy and a sheet metal part name. Further, a general directory may store all identifiers.

Multiple extension directories may also be provided for storing data files having the same file extension.

According to a preferred embodiment, the medium also stores an index that includes a virtual folder hierarchy that is updated after every successful operation. The index may include useful information associated with each identifier.

Preferably, the database is actually multiple databases, each database storing data files related to a different manufacturing process.

A stand alone data management system is provided for managing data files relating to sheet metal part production. The system includes a network and a database connected to the network. The database stores the data files and multiple identifiers representing sheet metal parts. Each identifier is linked to multiple data files associated with the represented sheet metal part. Consequently, when the identifier is operated on, selected linked data files are substantially simultaneously subject to the same operation. Preferably, the identifiers include a virtual folder hierarchy and a sheet metal part name.

In a preferred embodiment, the system also includes a server connected to the network and at least one client connected to the network. The server accommodates the database. At least one of the clients is capable of accessing the database. The client may be an NC device.

Preferably, the client includes a key manager control module, a client control module, and a server control module. The client control module and the server control module cooperatively establish a connection between the server and the client. The key manager control module creates identifiers and updates views, preferably by referring to an index.

The system may also include a stand alone manager that enables a user to operate on the data. Alternatively, or in addition, the system may include an application program interface. The application program interface enables a user to operate on the data from within an application.

BRIEF DESCRIPTION OF THE DRAWINGS

The present invention is further described in the detailed description that follows by reference to the noted plurality of drawings by way of non-limiting examples and preferred embodiments of the present invention, in which like reference numerals represent similar parts throughout several views of the drawings, and in which.

DETAILED DESCRIPTION OF THE PREFERRED EMBODIMENTS

According to the present invention, a user can operate on all of the data files associated with the manufacturing of a sheet metal part by simply operating on an abstraction of the sheet metal part. That is, a record having a common name related to the sheet metal part, e.g., "Sample Part," stores the address of each data file associated with the part referred to as Sample Part and thus links all associated data files to a single sheet metal part. Accordingly, a user wishing to load all of the files associated with Sample Part onto the user's local computer simply loads the "Sample Part" record and all of the related files are loaded without any additional user action because the part file is mapped to all associated data files.

In addition, the system of the present invention is a distributed system that operates on any type of computer only when the data is being manipulated. When merely viewing the data, an even more light weight design is provided. Furthermore, the user can select a manufacturing process, such as bending or laser cutting, and all sheet metal parts associated with the selected process can be viewed.

Figure 1:
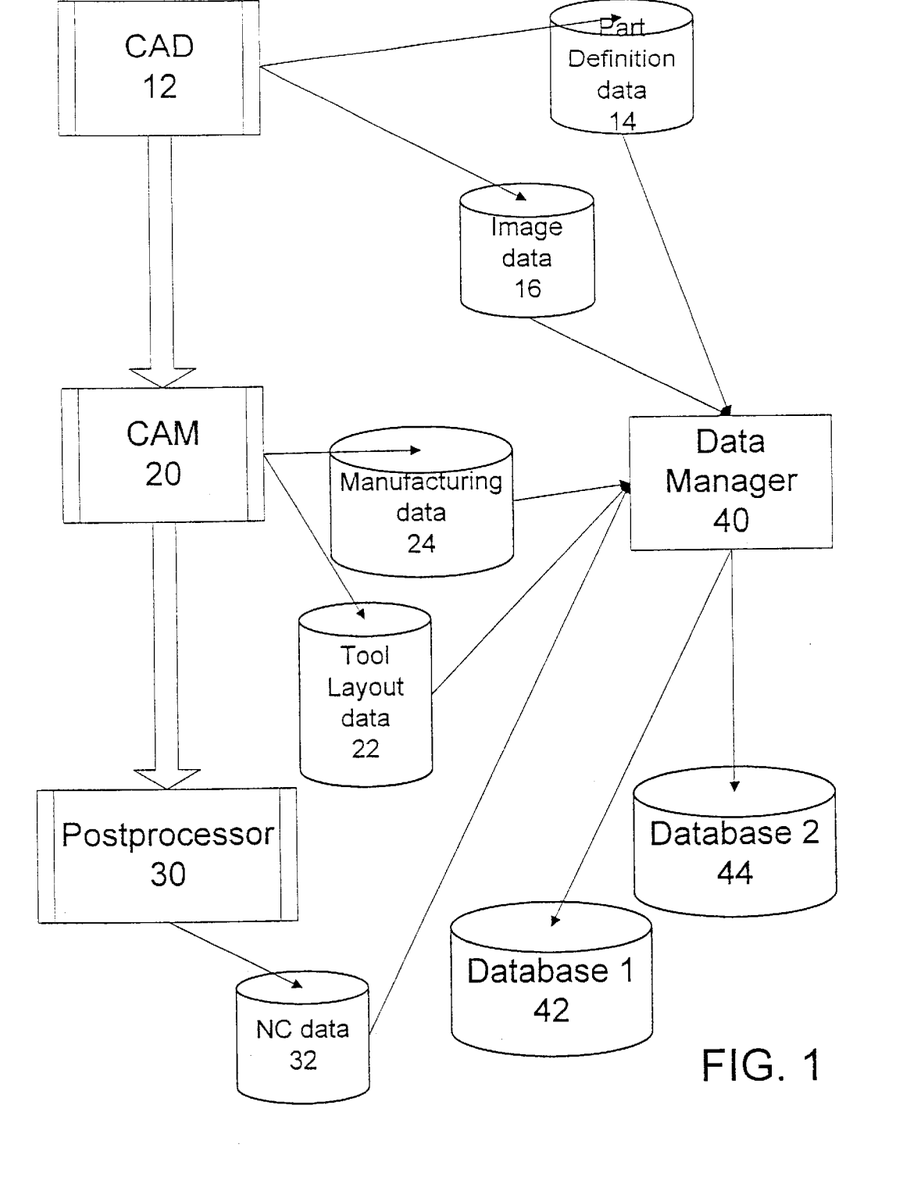
FIG. 1 shows a general view of a system for creating a sheet metal part production plan, according to an aspect of the present invention.

Referring to FIG. 1, the design of a production process for sheet metal part manufacturing is described. Initially, a user generates a computer model of desired sheet metal part with a computer-aided design (CAD) system 12. Accordingly, the CAD system generates part definition data 14 that geometrically describes the sheet metal part, including for example, the overall dimensions of the part, the sheet metal thickness, the bend angles, and the various features of the part such as flanges, etc. The CAD system 12 may also generate image data 16, such as a bit map or other type of graphics file, that will show a representation of the part on a computer display screen.

After the part is modeled by the CAD system 12, the user develops an overall manufacturing plan that may include multiple manufacturing processes. The following description refers to a bending process, although other manufacturing processes, such as laser cutting, may be substituted. In the case of a plan for a bending machine, the user selects tools, such as a punch and a die, and determines a bending sequence. A computer-aided manufacturing (CAM) system 20 facilitates the manufacturing plan development. In order to save the manufacturing plan, the CAM system 20 generates data corresponding to the tool configuration as well as other manufacturing data. The tool layout data 22 typically describes which tools will be utilized to create the part as well as the specific positioning of the tools. The manufacturing data 24 includes information such as bending sequence, bend allowance, etc.

A post processing system 30 may also be provided. The post processing system generates data specific to particular numeric control (NC) devices. The NC data 32 is manufacturing data that is readable by a particular machine. That is, the data is in a format corresponding to a specific NC device.

According to the present invention, all of the data generated by the CAD 12, CAM 20, and post processing 30 systems is managed by a data manager 40 that stores the information in a plurality of databases 42, 44. Although only two databases are shown in FIG. 1, more databases or a single database may be employed. In each database 42, 44, each part file is mapped to a predetermined number of associated data files. Thus, by utilizing the data manager 40 of the present invention, a user can manipulate all of the various types of data, for example the part definition data 14, the image data 16, the manufacturing data 24, the tool layout data 22, and the NC data 32, by simply operating on an abstraction that represents the specified sheet metal part. For example, a file named after the part (e.g., PART_H135) may be deleted, and all files associated with that part are deleted without any further action by the user. Moreover, because each part undergoes multiple manufacturing processes during production, for example, bending and laser cutting, the user can easily select data corresponding to a particular manufacturing process. Preferably, data corresponding to each manufacturing process is stored in a different database, such as first database 42 and second database 44. In a preferred embodiment, all of the data in the databases 42, 44 is compressed.

Figure 2:
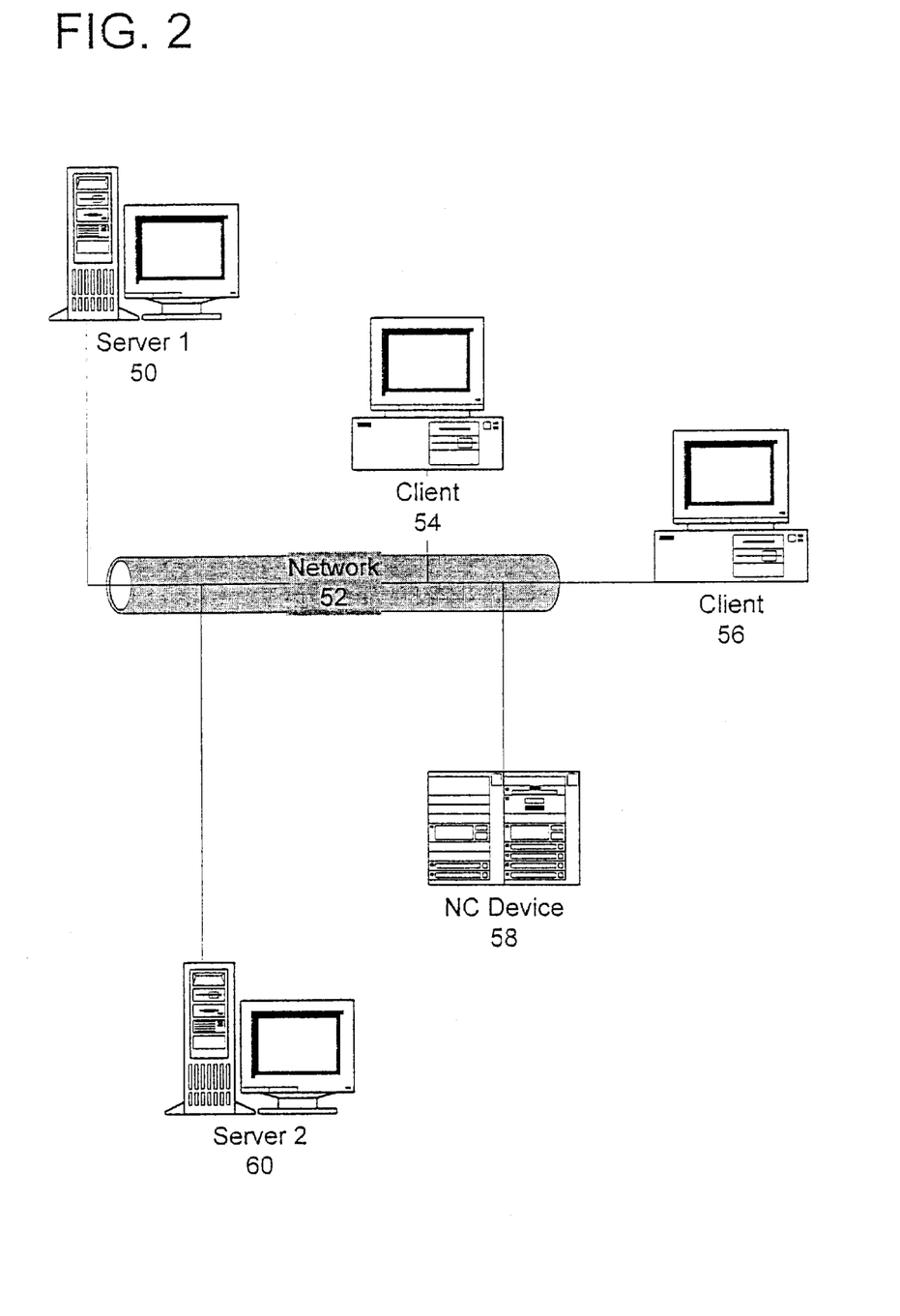
FIG. 2 illustrates a network architecture, according to an aspect of the present invention.

The present invention allows a user connected to a network, which stores all of the data, to access the data. Referring now to FIG. 2, an exemplary network architecture that allows a user to manipulate the network data is described. A first server 50 may be connected to a network 52. Preferably the first server 50 comprises an Intel Pentium class personal computer running an operating system such as Microsoft Windows 95. However, any personal computer and any operating system may be used. The network 52 may be any type of local area network, or for that matter wide area network, including the Internet. Multiple clients 54, 56 may also be connected to the network 52. Preferably, the clients are also stand alone personal computers running an operating system such as Windows 95. Similar to the first server 50, the clients 54, 56 are not limited to any particular operating system. An NC device 58 may also be attached to the network 52. A preferred NC device 58 is the AMNCPC available from Amada Company, Ltd. of Japan. A second server 60 may also be attached to the network 52. The second server 60 is similar to the first server 50. Although two servers 50, 60, two clients 54, 56, and a single NC device 58 are shown, any number of each of the devices may be connected to the network 52. For example, twenty clients, five servers, and three NC devices may be connected to the network 52. According to the present invention, a user at the first server 50, the second server 60, any of the clients 54, 56, or the NC device 58 can access data stored on either of the servers 50, 60 through the network 52.

Figure 3:
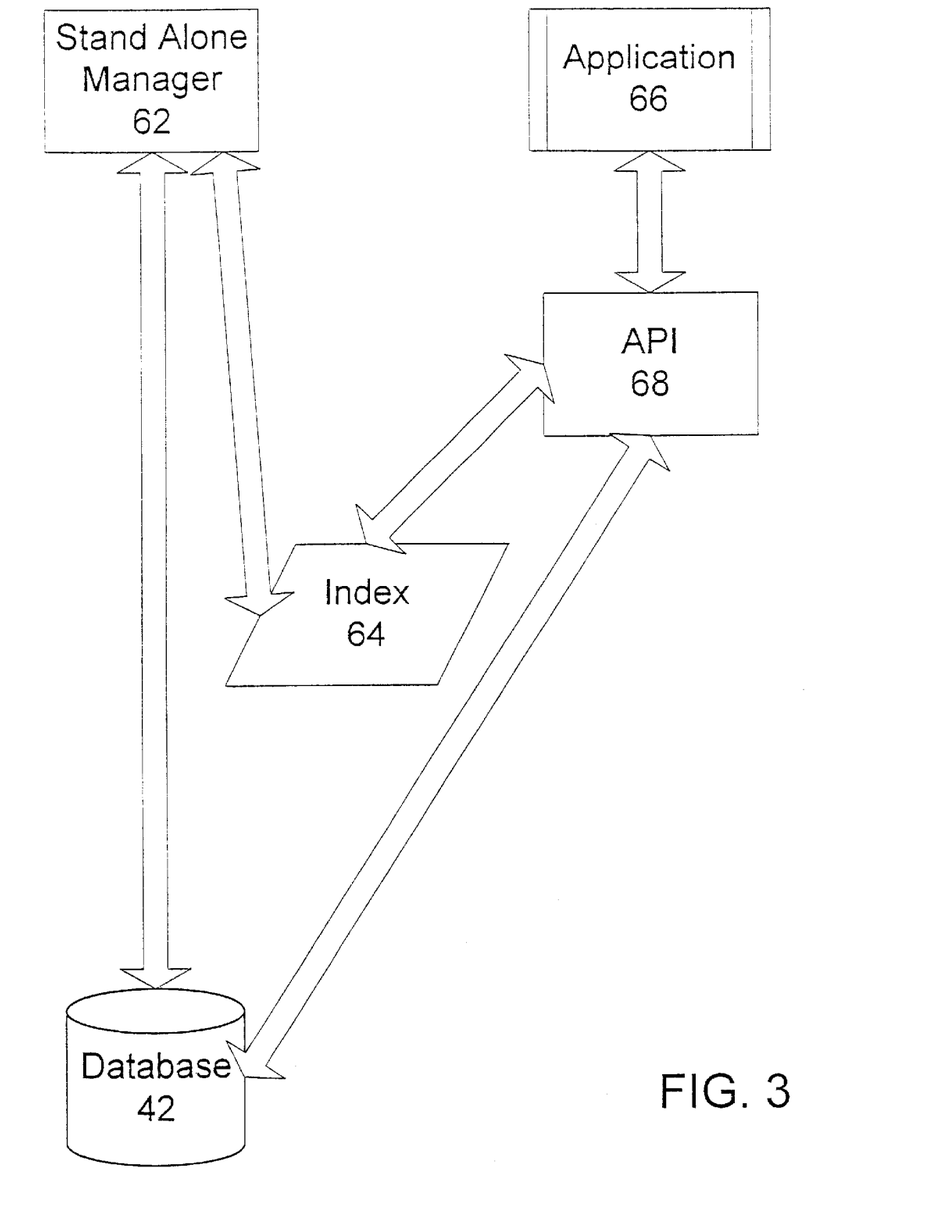
FIG. 3 shows a general overall data flow, according to an aspect of the present invention.

Referring now to FIG. 3, the database 42 and an index 64, both residing on at least one of the servers 50, 60, and a stand alone manager 62, application 66 and application program interface 68 residing on each server 50, 60, client 54, 56, and the NC controller 58 are described. Although only a single database is shown in FIG. 3, any number of databases may be utilized.

Figure 8:
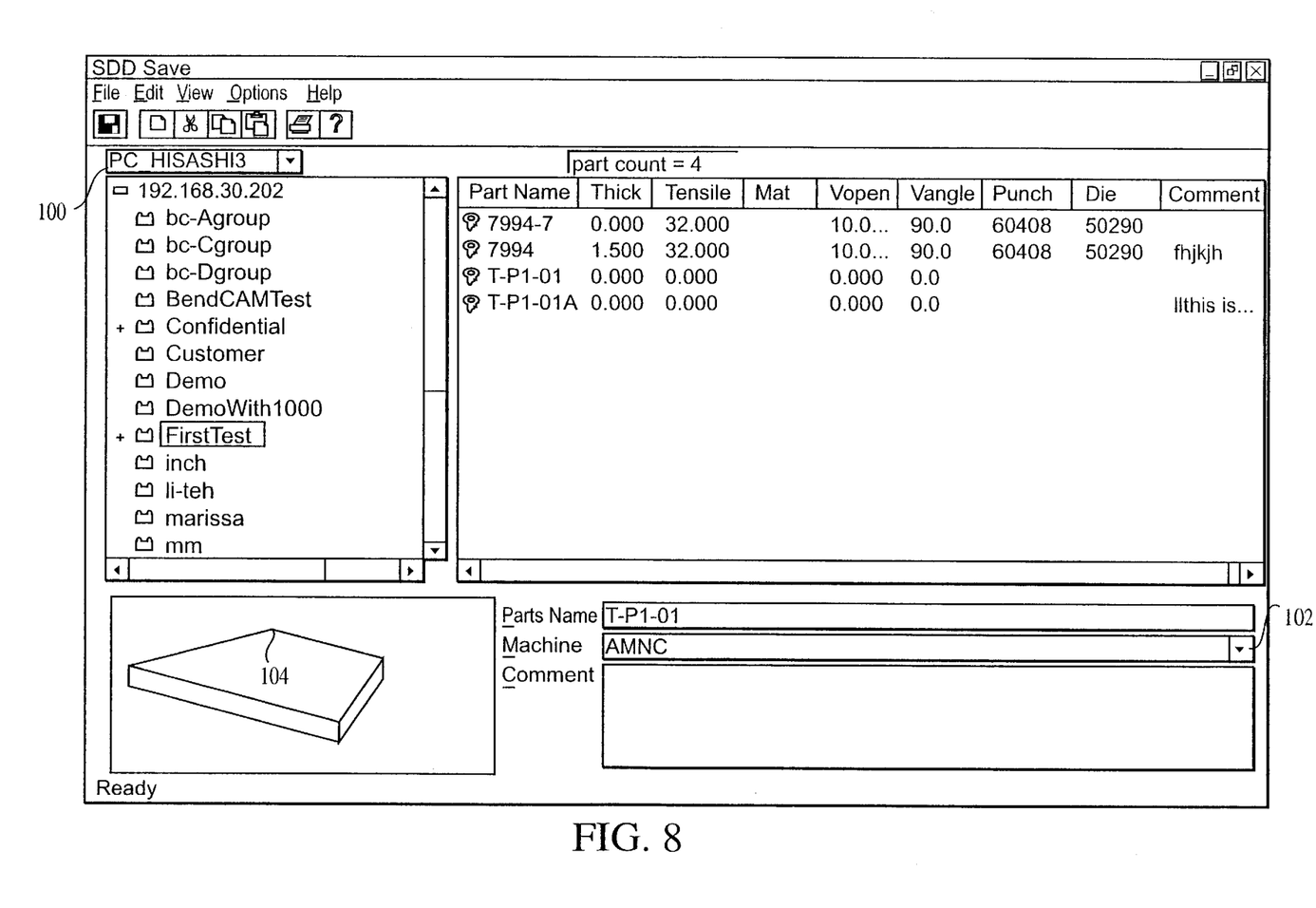
FIG. 8 shows an exemplary screen of a stand alone manager, according to an aspect of the present invention.

The system of the present invention includes a stand alone manager 62 that permits a user to see which sheet metal parts have data files stored in the database 42 and to manipulate all of the data associated with the individual sheet metal parts having data stored in the database 42. FIG. 8 shows an exemplary screen that is generated when launching the stand alone manager 62. The stand alone manager 62 provides the user with the ability to view data, load data, save data, and connect with other servers, as well as the ability to perform various editing functions necessary to organize the data, such as copying, pasting, deleting and searching for specific parts and the linked data files. The stand alone manager 62 interfaces directly with the database 42. The stand alone manager 62 also interfaces with an index 64.

The index 64 is a file that facilitates displaying all of the sheet metal parts in the database 42 in addition to other useful information. Thus, the index 64 includes a data structure for each part that stores a virtual folder hierarchy as well as useful information related to the part. One reason for providing the index 64 is because compared to the database 42, the index 64 is quicker to access. Exemplary useful information fields for a bending process are shown in FIG. 8. The information may include the sheet metal thickness, the sheet metal material, the tensile strength of the material, information relating to the tools, such as the width and V angle of a die, the punch being used to manufacture the part, the die being used to manufacture the part, and any other helpful comments. The useful information originates from the files created by the CAM process 20. When the user saves data files to the database 42, the information is removed from the files and stored in the index in binary format. The useful information originates from the files created by the CAM process 20. When the user saves data files to the database 42, the information is removed from the files and stored in the index binary format. When saved, it comes from bend CAM files. For different manufacturing processes, such as laser cutting, different information will be displayed.

On every connection to the index, all information is sent to the stand alone manager 62. Thus, the index provides a fast, lightweight method for the user to obtain information about a specified past. In order to increase speed, the data structure contains only the essential information to enable quicker access to the information.

According to a preferred embodiment, the virtual folder hierarchy is derived from a part's primary key, which identifies each part. The system automatically defines a part's primary key when the part is first added to the database. In order to create the virtual folder hierarchy, the primary key includes the part name, as defined by the CAD/CAM systems 12, 20, plus any folders that the user creates to help organize the part data. For example, if a part referred to as "Part 1" is ordered by Company X, the user might want to store the part, along with other Company X parts, in a Company X folder called "Company X." Thus, the primary key of Part 1 in this scenario would be Company X/Part 1. The folders are virtual because in reality all of the part files are physically stored in the same folder. That is, no "Company X" folder actually exists on the storage device. Rather, the folders are merely part of the primary key name making it easier for the user to search for parts and retrieve parts due to the displayed organizational hierarchy.

Optionally, the index 64 may also store the names and the locations of the various files related to each part. The number of files to which a part file is mapped to is predefined in the server. The number of files to which a part file is mapped to is predefined in the server. In this case, the index 64 keeps track of where the data files, e.g., the part definition data 14, the image data 16, the manufacturing data 24, the tool layout data 22, and the NC data 32 are physically located. Thus, the index links appropriate files to the part. If the index does not link a part to its associated files, a record will be defined in the database 42 to perform the link.

Figure 9:
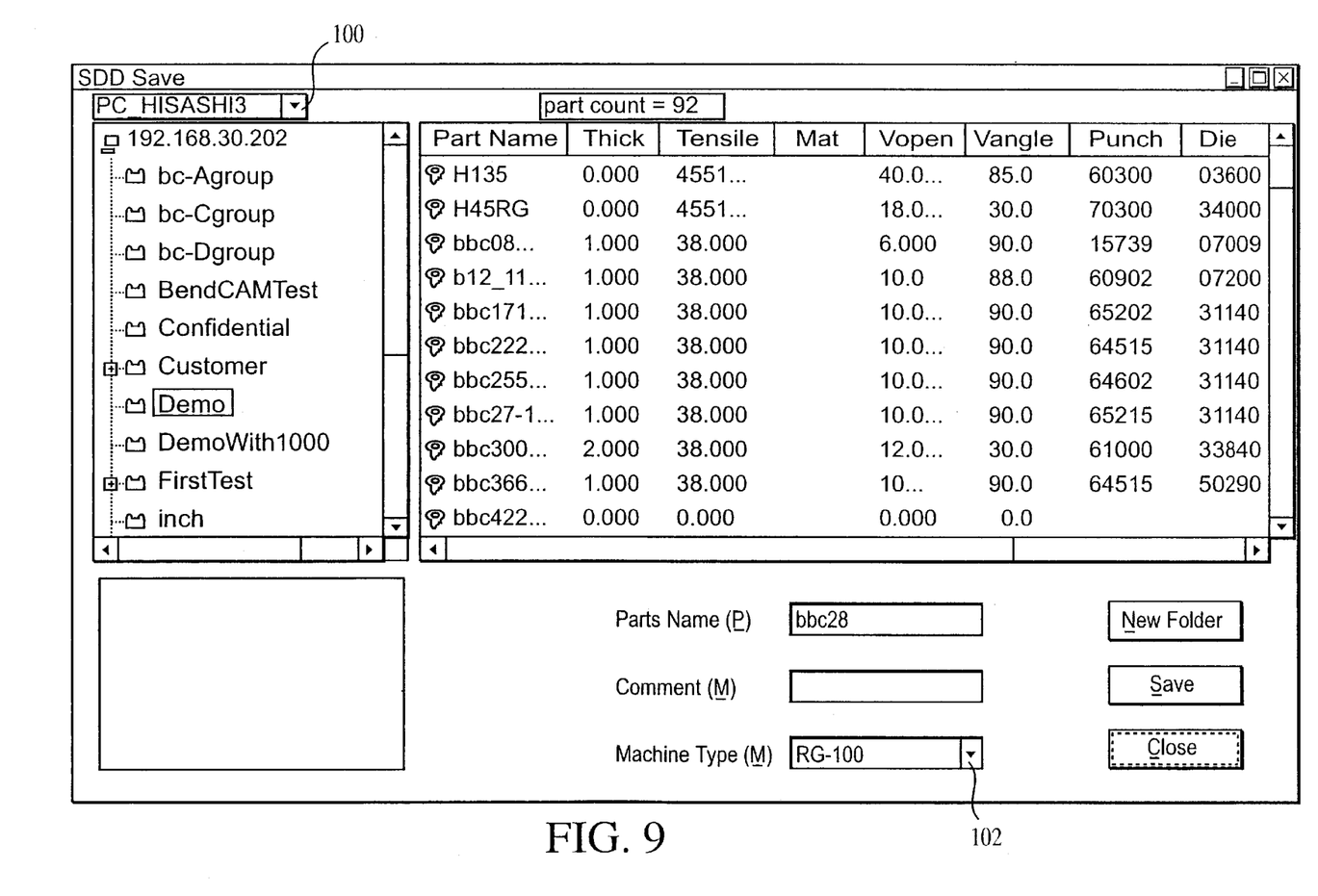
FIG. 9 shows an exemplary screen of an application program interface (API), according to an aspect of the present invention.

The user may also access the data from within an application 66, such as the CAD system 12 or the CAM system 20, without launching the stand alone manager 62. Of course, the application 66 must already be loaded on the machine. In this case, the application 66 calls an application program interface (API) 68 to access the part data. FIG. 9 shows an exemplary screen generated when running the API 68 from within the application 66. The API 68 embeds functionality within the application 66, thus providing the application 66 with the ability to access the database. The API 68 is application specific. That is, a different API 66 exists for different applications to handle application peculiarities, e.g., different data formats. When running the API 68 from the application 66, the user is preferably limited to loading and saving data. The API 68 communicates with the index 64 and the database 42 in a similar way to the stand alone manager's communication with the index 64 and database 42.

Figure 4:
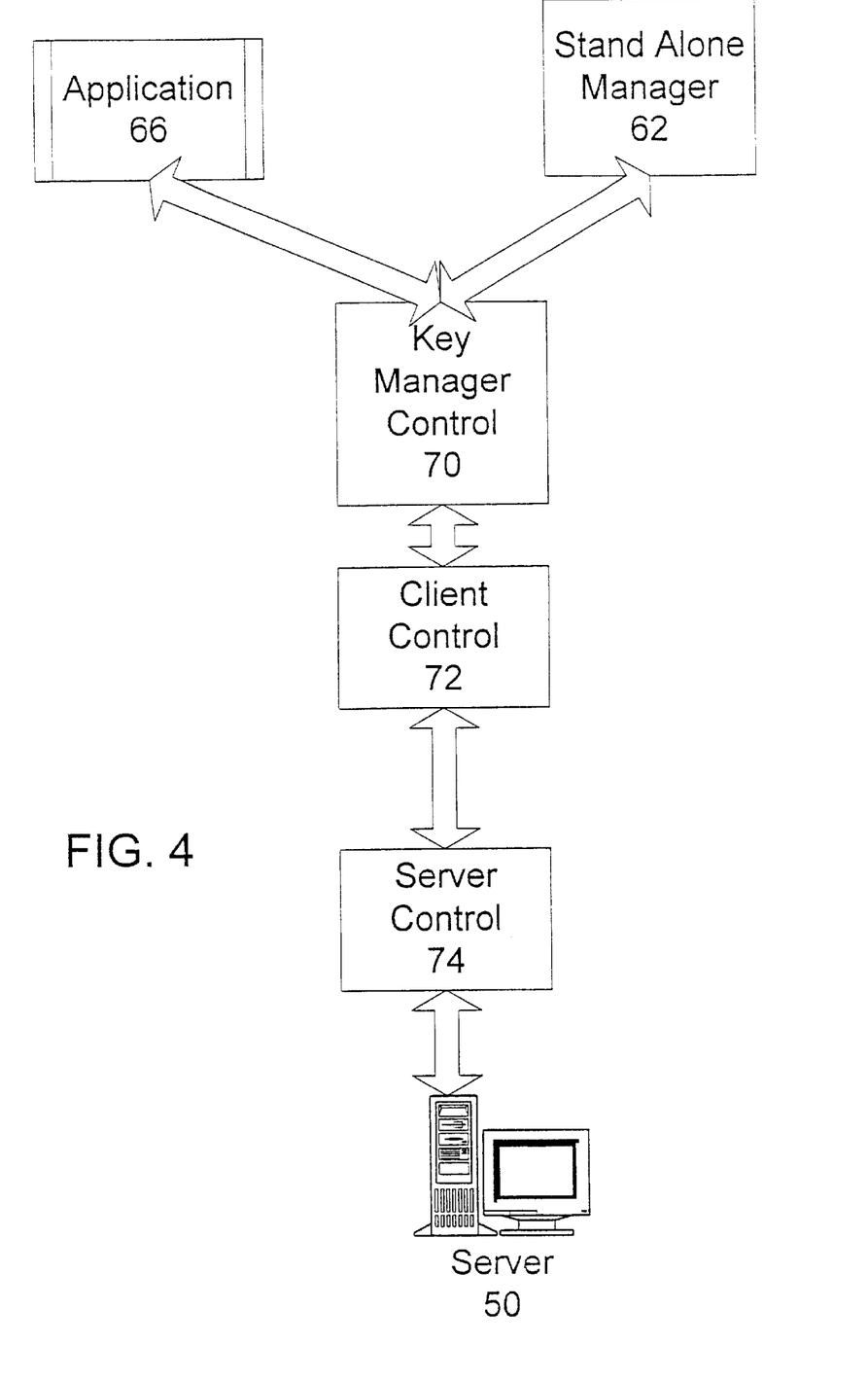
FIG. 4 shows an exemplary software architecture for manipulating sheet metal part production data, according to an aspect of the present invention.

In order for the client 54, 56, or the NC device 58 to access the data stored in the database 42, an architecture as shown in FIG. 4 is preferably employed. Initially, the user wanting to manipulate the data in the database 42, which resides on the server 50, launches the stand alone manager 62 or calls the API 68 from the application 66. At this point, the user may select a sheet metal part on the display and issue a command, such as LOAD. In response to the user's command, a key manager control module 70, which is embedded both in the API and in the stand alone manager 62, is called. Preferably, the key manager control module 70 is an ActiveX component.

ActiveX is a Microsoft architecture that allows a user to load components in a calling application. In other words ActiveX lets a program interact with other programs so that the calling application can use all of the functions within the component. All components are in a binary format so that any programming language can use the component. When a component is added to an application during an application call, it becomes available. Because ActiveX is well known, it is not discussed further.

The key manager control module 70 creates the primary key whenever a file is added to the database 42, for example during a SAVE operation. Moreover, when a LOAD command is executed, the key manager control module 70 informs the server of where to copy the file in the client, i.e., the working directory. The key manager control module 70 supports all other menu functions available to the user, such as copy, cut, and paste, etc.

After the key manager control module 70 receives the command from the application 66 or the stand alone manager 62 and executes the key manager functions, the key manager control module 70 passes the command to a client control module 72, which preferably resides within the key manager control module 70. The client control module 72 is responsible for establishing a connection with the server 50. A server control module 74, embedded in the client control module 72, cooperates with the client control module 72 to attempt to establish the connection between client 54, 56, or NC device 58 and the server 50. In a preferred embodiment, the connection is established by creating a socket and using WinSocket in a known manner. Alternatively, any type of connection mechanism native to the network 52 may be employed. The client control module 72 and serve control module 74 thus establish a connection and communicate with the server 50. After the communication is established, the user can call any function desired. The server control module 74, which receives the command from the client control module 72, passes the command onto the server 50, which executes the command.

In a preferred embodiment, the user connects to a server 50 by selecting a server from a server list contained in a drop down list 100, as seen in FIG. 9. In response to the user's selection, the client connects to the selected server 50.

After the server 50 processes the command, the results are sent through the server control module 74 and the client control module 72 to the key manager control module 70. The key manager control module 70 then updates the user's display. For example, if the user issued a DELETE command, and the server 50 successfully deleted the part, the key manager control module 70 deletes the part name from the display. The key manager control module 70 updates the view by referring to the index, which the server updates after a successful operation.

Figure 5:
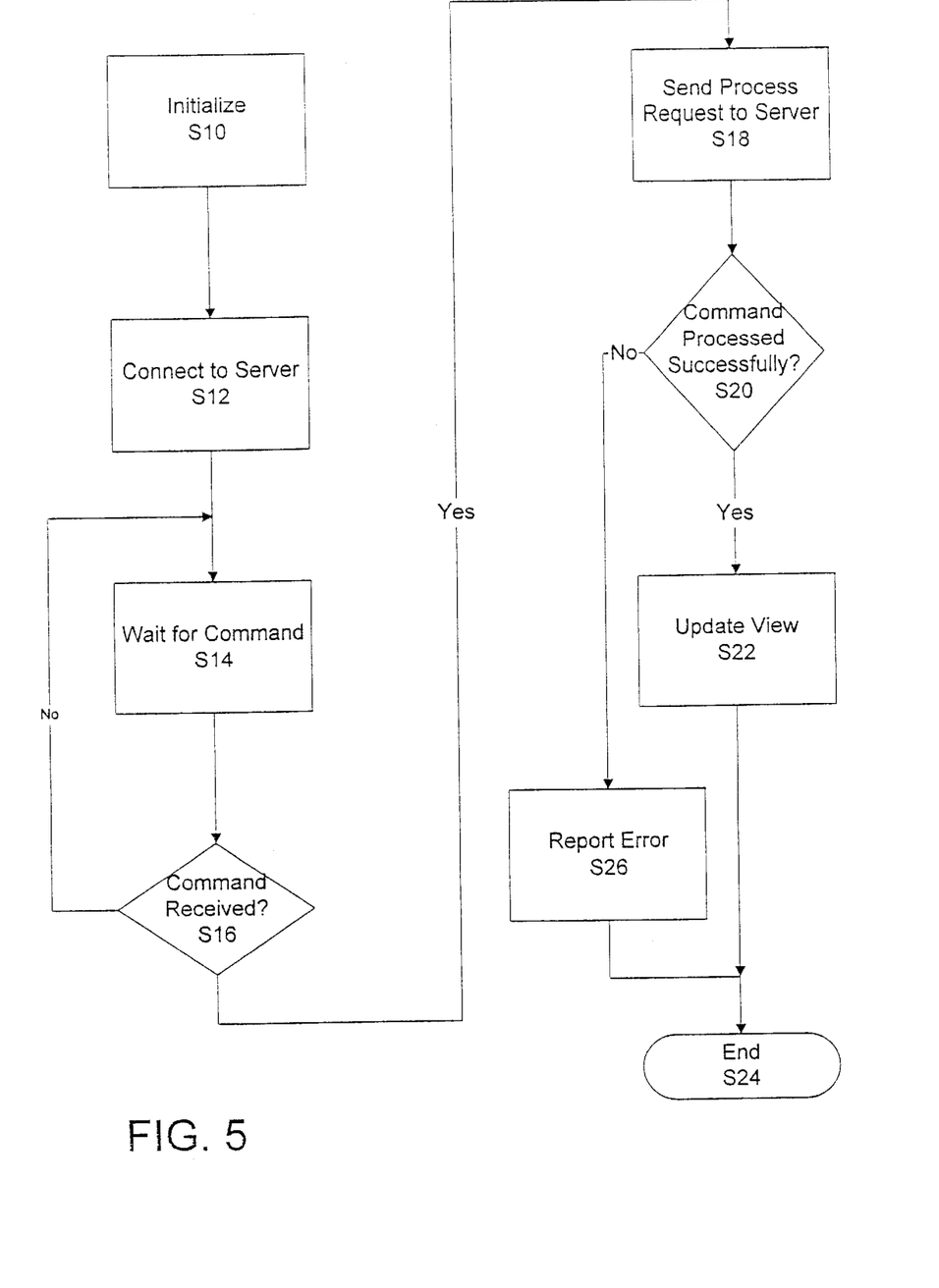
FIG. 5 shows an exemplary flow diagram of logic that executes on a client for command processing, according to an aspect of the present invention.

FIG. 5 shows an exemplary process that a client 54, 56 or NC device 58 executes in order to process a command from a user. Initially, at step S10, the system initializes. Then at step S12, the client 54, 56, or NC device 58 connects to the server 50. At step S14, the system waits for a user command. At step S16, it is determined whether or not the command is received. If no command is received, the logic proceeds to step S14 to continue waiting for a command.

Once the command is received, at step S18 the command is sent to the server 50 as described above. The client 54, 56 or NC device 58 then waits for an indication from the server 50 as to whether the command was successfully processed. At step S20 it is determined whether the command was successfully processed. If the command was successfully processed, at step S22 the view is updated by looking at the index as described above and the logic terminates at step S24. If the command is not successfully processed, at step S26 an error is reported to the user.

Figure 6:
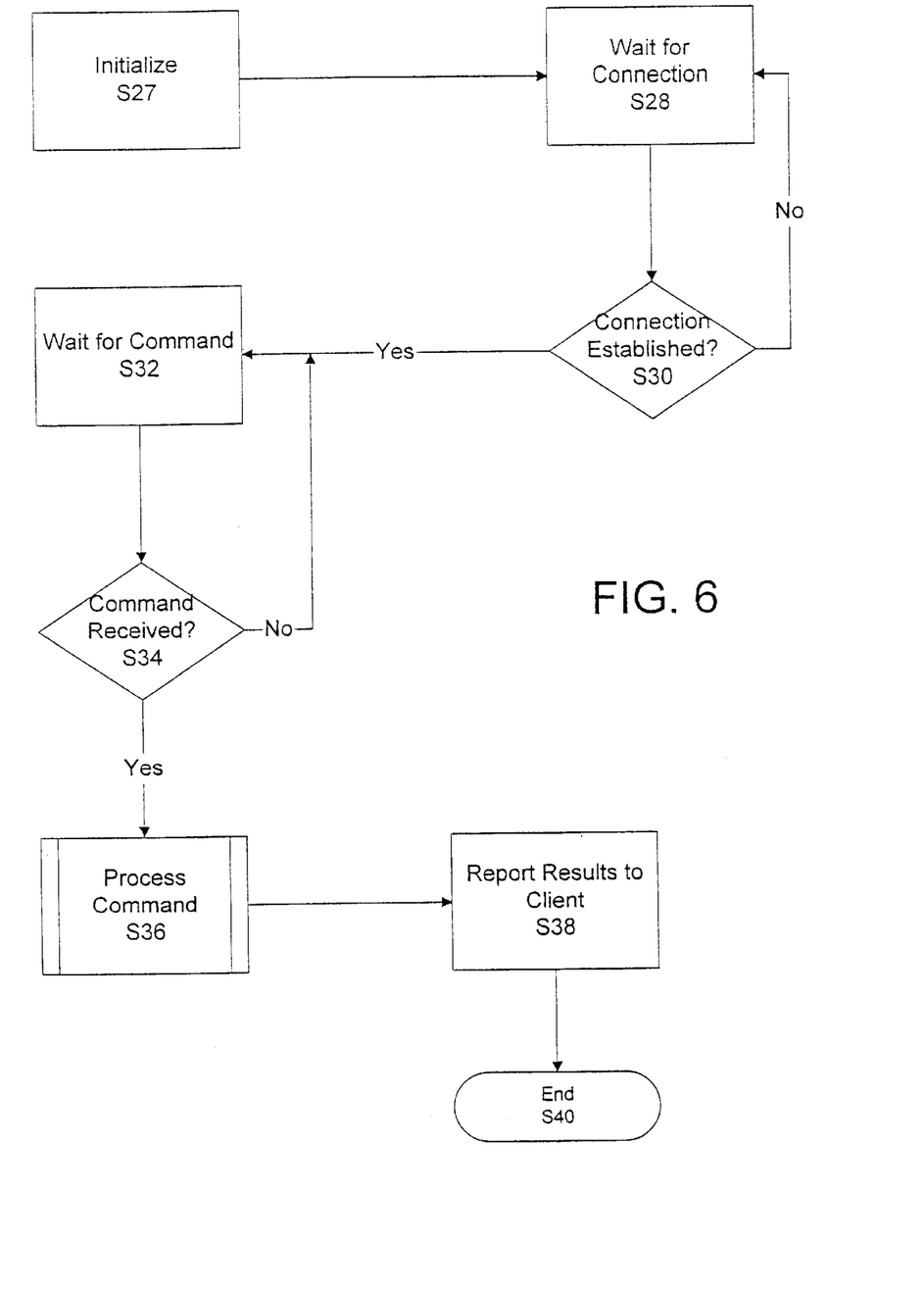
FIG. 6 shows an exemplary flow diagram of logic that executes on a server for command processing, according to an aspect of the present invention.

With reference to FIG. 6, exemplary logic that executes on the server 50 is now described. At step S26, the system initializes. After initialization, at step S27 the server 50 waits for a connection. If it is determined that no connection has been established at step S30, the logic returns to step S28 to continuously wait for a connection. If, however, a connection is received, the server 50 authorizes the connection and establishes the connection and at step S32 the server 50 waits for a command. At step S34 it is determined whether a command has been received. If no command has been received, the logic returns to steps S32 to wait for a command. When a command is received, the logic flows to step S36 to process the command. After successful processing, the server 50 updates the index 64. Finally, at step S38, the results of the command processing are reported to the client 54, 56, and the logic terminates at step S40.

Figure 7:
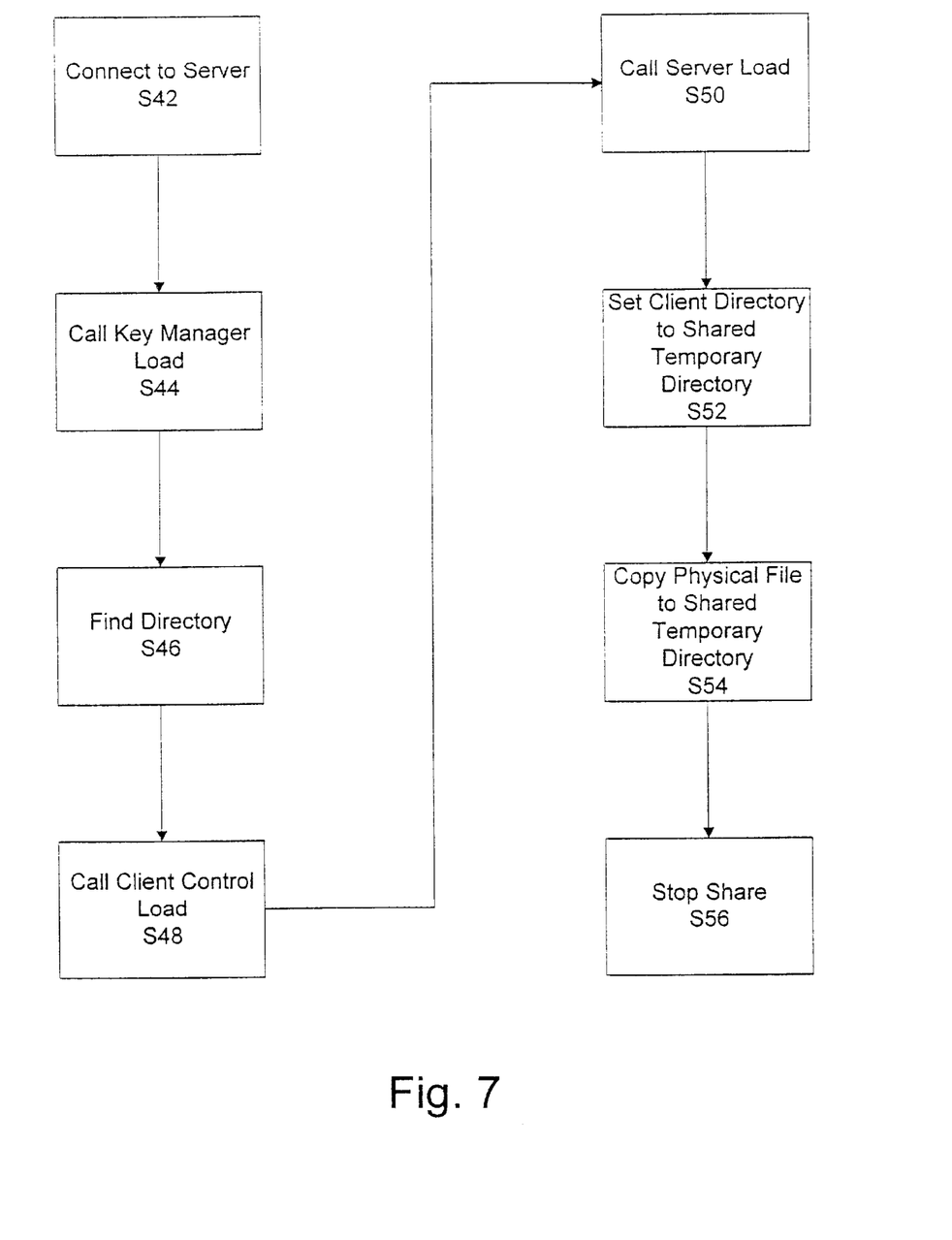
FIG. 7 shows an exemplary flow diagram for executing a command, according to an aspect of the present invention.

With respect to FIG. 7, an exemplary command process is described. Although the logic is described with respect to a LOAD command, the logic is similar for all other commands such as paste, copy, save, delete, etc. At step S42, the client 52, 54 or NC device 56 connects to the server 50 using the key manager as described above. A load function within the key manager control module 70 is then called at step S44. The key manager load function finds a directory where the file being loaded is located at step S46. At step S48, the key manager load function calls the client control copy function and passes the directory to the client control load function. At step S50, the client control load function calls the server to load the file. At step S52, the server sets the client directory as a shared temporary directory. At step S54, the server receives the part name and determines the manufacturing process and the machine type. Because the number of files to which a part file is mapped to is predefined in the server, the server is able to determine the corresponding file extensions to load, and then copies the physical files to the shared temporary directory. Finally, at step S56, the server stops the share. Of course, after the successful operation, the key manager updates the view as described above. As a result of the requested operation, all files associated with the part are copied to the client. Therefore, the user does not need to know the names of all of the associated files to manipulate all of the associated files. Rather, the user can simply locate the desired part and perform a single operation on the part.

Figure 10:
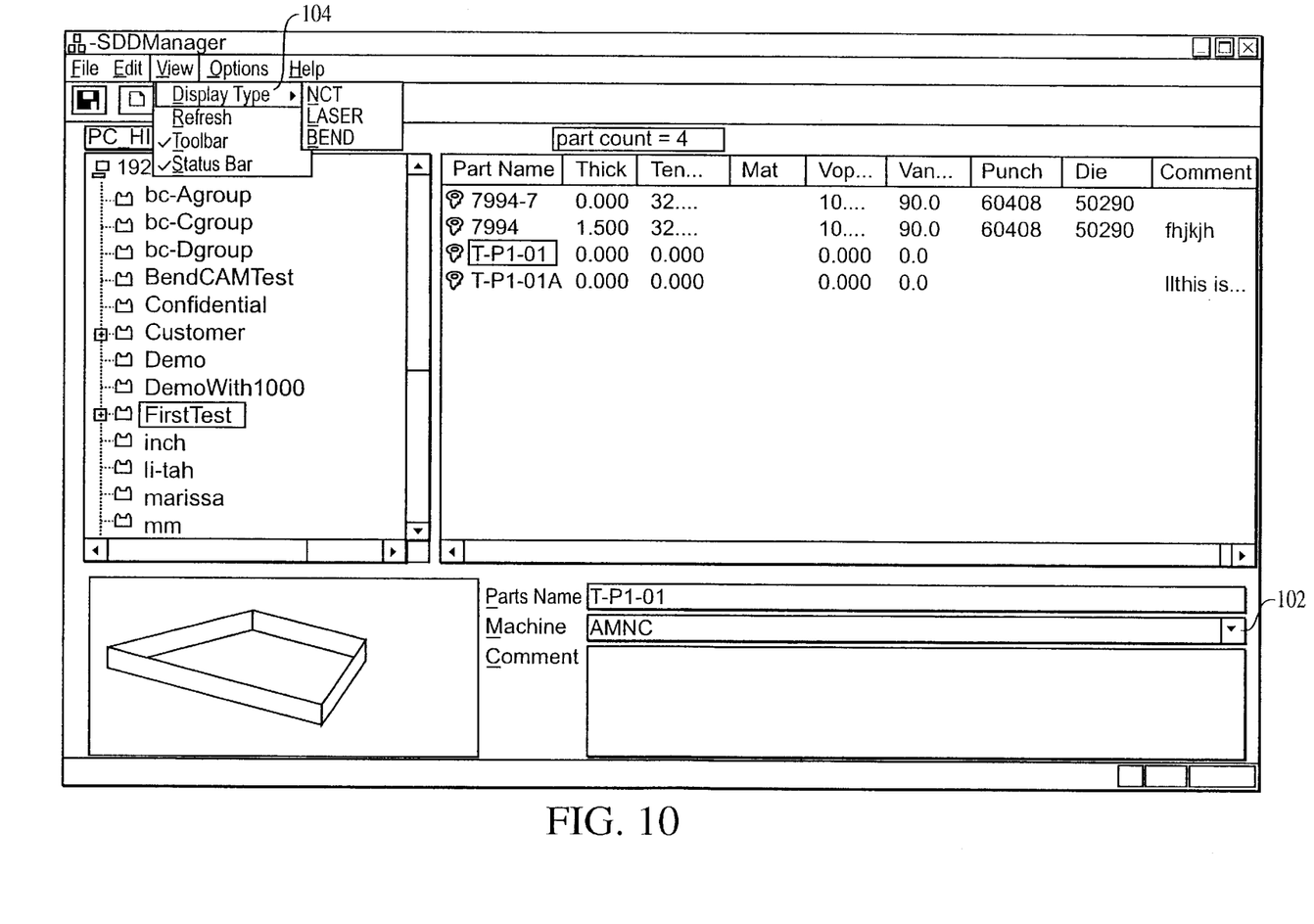
FIG. 10 shows an exemplary screen of a stand alone manager, including a view menu, according to an aspect of the present invention.

According to a preferred embodiment, each different manufacturing process, for example bending, has different parts associated with it. Accordingly, the user can initially select a manufacturing process, for example from a view menu as shown in FIG. 10. After the appropriate process is selected by the user, all parts associated with that manufacturing process are displayed on the screen. According to a preferred embodiment, the data corresponding to each manufacturing process is stored in a different database 42, 44. The user may further specify the parts desired to be viewed by selecting a machine type, such as from a machine type drop down list 102. Thus, the user may view parts having manufacturing data already generated for the selected machine type. When a different manufacturing process is selected, the available machine types will obviously change.

When a function is requested that does not require data manipulation, such as searching for the part or viewing the parts associated with a selected manufacturing process and machine type, the index 64 is searched instead of the actual database 42. Searching the index is quicker than searching through an entire database. The index 64 accurately reflects the location of parts in the database 42 because when the part is operated on, all related files are subject to the same operation and the index is updated.

The present invention allows any computer on a network to access and view all parts having associated data stored in a database on a main computer or computers. That is, the database can be stored on a single computer or multiple computers. Also, the user has the ability to access different computers. Moreover, all other computers on the network see the same data files while maintaining a common source of data and thus the advantage of centralized management.

According to a preferred embodiment, every type of file (e.g., files having the same extension type), for example part definition data 14, image data 16, manufacturing data 24, tool layout data 22, and NC data 32 is stored in its own directory. That is, the part definition data 14 is stored in one directory, the image data 16 is stored in another directory, the manufacturing data 24 is stored in another directory, the tool layout data 22 is stored in a different directory, and the NC data 32 is stored in a different directory. In order to save files in the proper directories when operating the CAD system 12 or the CAM system 20 or post processing system 30, files are saved using the API 68 of the present invention. The API 68 knows where to store each file type and thus stores each file type in the database 42 in the proper location. The API save also retrieves information to be stored in the index 64. API saving may be in addition to any save that is local to the computer running the CAD system 12, CAM system 20, or post processing system 30.

According to a preferred embodiment, when a part is selected, an image file, for example a bit map file, is retrieved from the database 42. The image may be displayed, for example in a display window 104, when the stand alone manager 62 or API 68 is called and the user selects a part.

According to a preferred embodiment, an import function and an export function are provided. The import function copies a virtual folder hierarchy from a diskette to the computer executing the import folder and finds a selected folder on the network. The export function copies the virtual folder hierarchy from the computer executing the export to a diskette with the folder open at the time of export being left open. The export function and import function allow a user to locate a part file on one computer and immediately find that part on the importing computer without conducting a search. According to another embodiment, the complete index, including the useful text information, may be imported and exported, or the entire database may be imported and exported.

Other functions may be provided such as storing the files on a floppy diskette and controlling access to a particular file. That is, a client may only be permitted to view files that the client is allowed to access.

Although the server has been described as a single computer, the server 50 can be implemented as multiple computers. That is, the database may be stored on several computers.

According to a preferred embodiment, additional servers may be located remotely from the network. For example, the user may access the other servers via the Internet. If the user would like to access the remote server through the Internet, the user can simply type in the IP address of the server and the client will then connect to the server, thus giving the client access to all of the data on that server. In this embodiment, the server list 100 displays all servers connected to the network but not the servers connected via the Internet. Any servers connected via the Internet are viewed as web pages.

According to another preferred embodiment, the user can print out the data in any of the files linked to a selected sheet metal part. The data may be printed in the form of a bar code or in text format.

While the invention has been described with reference to several exemplary embodiments, it is understood that the words that have been used herein are words of description and illustration, rather than words of limitation. Changes may be made, within the purview of the appended claims, as presently stated and as amended, without departing from the scope and spirit of the invention and its aspects. Although the invention has been described with reference to particular means, materials and embodiments, the invention is not intended to be limited to the particulars disclosed herein; rather, the invention extends to all functionally equivalent structures, methods and uses, such as are within the scope of the appended claims. For example, although the present invention has been described with reference to sheet metal parts applicability to other fields is also within the scope of the present invention.

What is claimed is:

1. A method of managing data files relating to sheet metal part production, the data files residing on a computer network, the method comprising:

creating an identifier for a sheet metal part by obtaining and linking a sheet metal part name with a virtual folder for the sheet metal part, the virtual folder defined within a virtual folder hierarchy;

linking the identifier with all the data files relating to the production of the sheet metal part by associating the virtual folder with all the data files related to the production of the sheet metal part;

storing the identifier in an index; and selecting a plurality of the linked data files in accordance with predetermined criteria;

wherein, when the identifier is operated on, the selected linked data files are substantially simultaneously subject to the same operation; and wherein the index is updated when an operation is performed using the identifier.

2. The method of claim 1, in which the predetermined criteria further comprises a manufacturing process.

3. The method of claim 1, further comprising storing all identifiers in a single directory.

4. The method of claim 1, in which the selecting further comprises retrieving an image file, and displaying the image file.

5. The method of claim 1, further comprising connecting to a server that is storing the data files.

6. A computer readable medium for storing a database related to sheet metal part production, the medium comprising:

a plurality of data files associated with sheet metal parts; and a plurality of identifiers representing the sheet metal parts, each identifier created by obtaining and linking a sheet metal part name with a virtual folder for the sheet metal part, the virtual folder defined within a virtual folder hierarchy, each identifier being linked to a plurality of data files associated with the represented sheet metal part by associating the virtual folder with the plurality of data files associated with the represented sheet metal part, wherein the identifier is stored in an index;

wherein, when the identifier is operated on, the selected linked data files are substantially simultaneously subject to the same operation, and wherein the index is updated when an operation is performed using the identifier.

7. The medium of claim 6, further comprising a general directory that stores all identifiers.

8. The medium of claim 7, further comprising a plurality of extension directories, each extension directory storing all data files having a same file extension.

9. The medium of claim 6, in which the index further comprises useful information, at least one set of useful information being associated with each identifier.

10. The medium of claim 6, in which the database further comprises a plurality of databases, each database storing data files related to a different manufacturing process.

11. A stand alone data management system for managing data files relating to sheet metal part production, the system comprising:

a network; and a database connected to the network, the database storing the data files and a plurality of identifiers representing sheet metal parts, each identifier created by obtaining and linking a sheet metal part name with a virtual folder for the sheet metal part, the virtual folder defined within a virtual folder hierarchy, each identifier being linked to a plurality of data files associated with the represented sheet metal part by associating the virtual folder with the plurality of data files associated with the represented sheet metal part, wherein the identifier is stored in an index;

wherein, when one of the identifiers is operated on, selected linked data files are substantially simultaneously subject to the same operation, and wherein the index is updated when an operation is performed using the identifier.

12. The system of claim 11, further comprising a server connected to the network, the server comprising the database, and at least one client connected to the network, the at least one client being capable of accessing the database.

13. The system of claim 12, in which the at least one client further comprises a key manager control module, a client control module, and a server control module, the client control module and the server control module cooperatively establishing a connection between the server and the client, the key manager control module creating identifiers and updating views.

14. The system of claim 13, in which the key manager control module updates the views by referring to an index.

15. The system of claim 12, in which the client further comprises a numerical control device.

16. The system of claim 11, further comprising a stand alone manager that enables a user to operate on the data.

17. The system of claim 11, further comprising an application program interface, the application program interface enabling a user to operate on the data from within an application.

* * * * *